US012603388B2

(12) United States Patent
Ruzicka et al.

(10) Patent No.: US 12,603,388 B2
(45) Date of Patent: Apr. 14, 2026

(54) SINGLE-ION ELECTROLYTES FOR SOLID-STATE ALKALINE BATTERIES

(71) Applicant: The Government of the United States of America, as represented by the Secretary of the Navy, Arlington, VA (US)

(72) Inventors: Eric G. Ruzicka, Neenah, WI (US); Hunter O. Ford, Falls Church, VA (US); Brian L. Chaloux, Alexandria, VA (US); Megan B. Sassin, Honolulu, HI (US); Jeffrey W. Long, Alexandria, VA (US); Debra R. Rolison, Arlington, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 19/296,208

(22) Filed: Aug. 11, 2025

(65) Prior Publication Data

US 2026/0094934 A1 Apr. 2, 2026

Related U.S. Application Data

(60) Provisional application No. 63/700,382, filed on Sep. 27, 2024.

(51) Int. Cl.
*H01M 50/414* (2021.01)
*B01J 41/05* (2017.01)
(Continued)

(52) U.S. Cl.
CPC ........... *H01M 50/414* (2021.01); *B01J 41/05* (2017.01); *B01J 41/14* (2013.01); *B01J 47/12* (2013.01);
(Continued)

(58) Field of Classification Search
CPC ............. H01M 50/414; H01M 50/403; H01M 50/457; H01M 50/409; H01M 50/411;
(Continued)

(56) References Cited

U.S. PATENT DOCUMENTS 9,309,343 B2 4/2016 Bercum et al.
9,321,047 B2 4/2016 Jikihara et al.
(Continued)

FOREIGN PATENT DOCUMENTS

JP 2000212306 * 8/2000
JP 2000212306 A 8/2000
(Continued)

OTHER PUBLICATIONS

Akiyama et al., Macromolecules 2019, 52, 2131-2138.
(Continued)

*Primary Examiner* — Matthew W Van Oudenaren
(74) *Attorney, Agent, or Firm* — US Naval Research Laboratory; Joseph T. Grunkemeyer

(57) ABSTRACT

Disclosed herein are materials for use in battery separators. They include copolymers of a divinylbenzene and one or both of the monomers below (non-linked and linked). R is an n-alkylene group, and n is a positive integer. The copolymer made be made from tertiary amine monomers that are converted to quaternary amines. One battery includes a zinc
(Continued)

anode, a silver cathode, and a tri-layer separator. The inner layer uses the linked monomer, and the outer layers use the non-linked monomer.

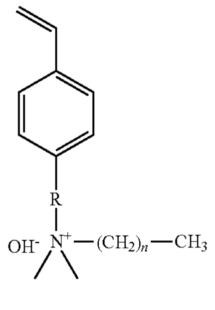

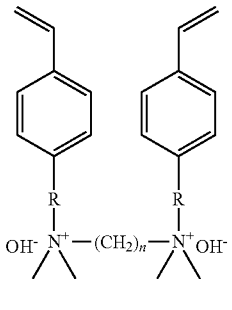

8 Claims, 14 Drawing Sheets

(51) Int. Cl.

| | |
|---|---|
| ***B01J 41/14*** | (2006.01) |
| ***B01J 47/12*** | (2017.01) |
| ***C08F 8/44*** | (2006.01) |
| ***C08J 5/22*** | (2006.01) |
| ***H01M 10/28*** | (2006.01) |
| ***H01M 10/32*** | (2006.01) |
| ***H01M 50/403*** | (2021.01) |
| ***H01M 50/457*** | (2021.01) |

(52) U.S. Cl.
CPC ............... *C08F 8/44* (2013.01); *C08J 5/2275* (2013.01); *H01M 10/28* (2013.01); *H01M 10/32* (2013.01); *H01M 50/403* (2021.01); *H01M 50/457* (2021.01); *C08F 2810/00* (2013.01); *C08J 2325/18* (2013.01)

(58) Field of Classification Search
CPC .. H01M 50/449; H01M 50/497; H01M 10/28; H01M 10/32; H01M 10/0565; H01M 10/26; H01M 4/54; H01M 2300/0014; H01M 2300/0025; H01M 2300/0082; B01J 41/05; B01J 41/07; B01J 41/14; B01J 47/12; C08F 8/44; C08F 2810/00; C08J 5/2275; C08J 5/2206; C08J 5/2218; C08J 2325/18
See application file for complete search history.

(56) References Cited

U.S. PATENT DOCUMENTS

| | | | |
|---|---|---|---|
| 9,370,773 | B2 | 6/2016 | Masel et al. |
| 10,125,036 | B2 | 11/2018 | Jikihara et al. |
| 10,290,890 | B2 | 5/2019 | Yan et al. |
| 10,626,029 | B2 | 4/2020 | Lin |
| 10,727,515 | B2 | 7/2020 | Miyatake et al. |
| 10,947,339 | B2 | 3/2021 | Miyatake et al. |
| 11,512,156 | B2 | 11/2022 | Yan et al. |
| 2013/0284601 | A1 | 10/2013 | Van Der Wal et al. |
| 2017/0014772 | A1 | 1/2017 | Linder et al. |
| 2020/0308341 | A1 | 10/2020 | Yan et al. |
| 2022/0212183 | A1 | 7/2022 | Kerres |

FOREIGN PATENT DOCUMENTS

| | | | |
|---|---|---|---|
| JP | 2000290829 A | | 10/2000 |
| JP | 2001002738 A | | 1/2001 |
| JP | 2001114826 A | | 4/2001 |
| JP | 2001139868 A | | 5/2001 |
| WO | WO2024177351 | * | 8/2024 |

OTHER PUBLICATIONS

Baca et al., Materials Science and Engineering 8 (2010) 012043.
Carbone et al., Chemical Engineering Journal 455 (2023) 140765.
Ezzeldin et al., International Journal of Polymer Science vol. 2010, Article ID 684051.
Ford et al., ACS Org. Inorg. Au 2025, 5, 37-46.
Ford et al., RSC Appl. Interfaces, 2024, 1, 531.
Ford et al., RSC Appl. Interfaces, 2024, 1, 522.
Gaines, J. Electrochem. Soc.: Reviews and News, 116, 2, 61C-67C (1969).
Kimura et al., ACS Appl. Energy Mater. 2020, 3, 469-477.
Liu et al., Chemical Engineering Journal 437 (2022) 135409.
Mahmoud et al., J. Mater. Chem. A, 2018, 6, 14400.
Mahmoud et al., ACS Appl. Energy Mater. 2022, 5, 15211-15221.
Mandal et al., ACS Appl. Energy Mater. 2022, 5, 8611-8620.
Marini et al., The Electrochemical Society Prime 2024 (Oct. 9, 2024).
Marino et al., ChemSusChem 2015, 8, 513-523.
Martin et al., Chem. Vap. Deposition 2006, 12, 685-691.
Mathew et al., Acc. Mater. Res. 2023, 4, 299-306.
Pham et al., J. Mater. Chem. A 2018, 6, 16537.
Schönemann et al., Polymers 2018, 10, 639.
Shirase et al., ACS Omega 2022, 7, 13577-13587.
Shirole et al., ACS Appl. Energy Mater. 2023, 6, 7240-7249.
You et al., Progress in Polymer Science 100 (2020) 101177.

* cited by examiner

SINGLE-ION ELECTROLYTES FOR SOLID-STATE ALKALINE BATTERIES

REFERENCE TO RELATED APPLICATIONS

This application claims the benefit of U.S. Provisional Application No. 63/700,382, filed on Sep. 27, 2024. The provisional application and all other publications and patent documents referred to throughout this nonprovisional application are incorporated herein by reference.

TECHNICAL FIELD

The present disclosure is generally related to electrolytes for alkaline batteries.

DESCRIPTION OF THE RELATED ART

Anion-exchange membranes (AEMs) are materials that contain fixed positive charges (cations) and mobile negative charges (anions). Owing to their unique mass/ion-transport properties, AEMs are used in numerous fields, including alkaline fuel cells/batteries, chemical/ionic separations, and biomedical surface engineering as anti-fouling coatings. The fixed cation can be a charged nitrogen center such as a quaternary ammonium (QA), guanidinium, or imidazolium, a charged phosphorous center such as phosphonium, or a ligated metal (e.g., $Ba^{2+}$-cryptand, $Ru^{3+}$-terpyridyl). [1] The mobile anion can be any anionic species, as required by the particular application. Hydroxide-conducting AEMs (a.k.a. alkaline polymer electrolytes) have been extensively developed for hydrogen and methanol fuel cells and water electrolyzer applications, and very recently demonstrated for alkaline batteries. [2]

Work has been done to improve the (electro)chemical stability of AEMs, especially in alkaline environments. Quaternary ammonium groups are prone to degradation via elimination reactions, and the architecture of the polymer as well as the placement of the QA predominantly dictate the chemical and mechanical performance of the membrane. Preventing membrane degradation is imperative for maintaining the performance of AEM-based devices such as fuel cells and alkaline batteries. While cation centers such as phosphonium are more stable than QAs, some applications dictate the use of a QA (e.g., volatility of the precursor necessary to fabricate polymer films via initiated chemical vapor deposition for use as polymer electrolytes in alkaline batteries).

Considering QA and other nitrogen center-based AEMs, these materials are almost invariably prepared from neutral precursors by quaternization of a polymer-bound alkyl halide with a tertiary amine (e.g., trimethylamine, pentamethylguanidine, N-methylimidazole). [1-13] Such syntheses leave residual halide that is difficult to remove quantitatively by anion exchange, even upon repeated washing. While residual halide is not a problem for some applications (e.g., fuel cells), it can disrupt the operation of alkaline batteries by introducing a pathway for continuous self-discharge and electrode corrosion.

SUMMARY OF THE INVENTION

Disclosed herein is a copolymer of a divinylbenzene and the below compound. Each R is an independently selected n-alkylene group, and n is a positive integer.

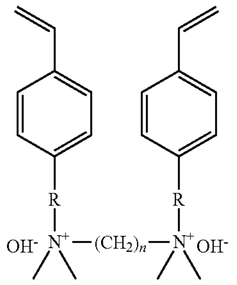

Also disclosed herein is a battery comprising: an anode comprising zinc, a cathode comprising silver, and a separator between the anode and the cathode. The separator comprises a porous membrane permeated with a copolymer of a divinylbenzene and a monomer having the formula below. R is an n-alkylene group, and n is a non-negative integer.

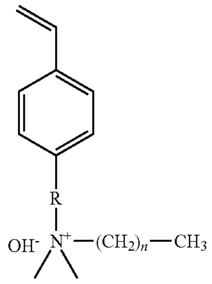

Also disclosed herein is a method comprising: permeating a porous membrane with divinylbenzene and a monomer having the formula:

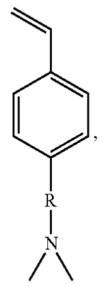

copolymerizing the divinylbenzene and the monomer to form an amine copolymer, reacting the amine copolymer with a sulfonate compound having the formula $CH_3$—$SO_2$—O—$(CH_2)_n$—$(O—SO_2)_m$—$CH_3$, where m is zero or one, to form a quaternary amine copolymer, and reacting the quaternary amine copolymer with NaOH to form a copolymer of the divinylbenzene and one of the below structures. R is an n-alkylene group and n is a non-negative integer when m is zero and a positive integer when m is one.

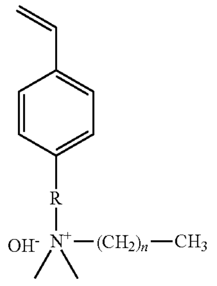

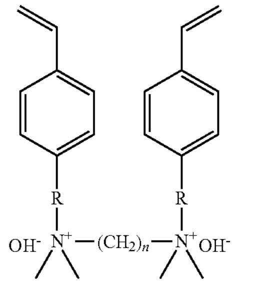

BRIEF DESCRIPTION OF DRAWINGS

A more complete appreciation will be readily obtained by reference to the following Description of the Example Embodiments and the accompanying drawings.

FIG. 1A shows 4-dimethylaminomethylstyrene (DMAMS) monomer. FIG. 1B shows 4-dimethylaminobutylstyrene (DMABS) monomer. FIG. 1C shows methyl methanesulfonate. FIG. 1D shows n-octyl methanesulfonate (octyl tail). FIG. 1E shows 1,8-bis-(methanesulfonyl)octanediol (octyl linker).

FIG. 2A shows p[DVB-DMABS$^+$OH$^-$)]methyl. FIG. 2B shows p[DVB-DMABS$^+$OH$^-$)] octyl linker. FIG. 2C shows p[DVB-DMABS$^+$OH$^-$)] octyl tail. FIG. 2D shows p[DVB-DMAMS$^+$OH$^-$)]methyl. FIG. 2E shows p[DVB-DMAMS$^+$OH$^-$)] octyl linker. FIG. 2F shows p[DVB-DMAMS$^+$OH$^-$)] octyl tail.

FIG. 6A shows monolayer p[DVB-DMABS$^+$(OH$^-$)] synthesized with methyl methanesulfonate (methyl). FIG. 6B shows monolayer p[DVB-DMABS$^+$(OH$^-$)]1,8-bis-(methanesulfonyl)octanediol (linker). FIG. 6C shows a trilayer of p[DVB-DMABS$^+$(OH$^-$)]methyl-linker-methyl. In each experiment, the polymer electrolyte is prepared within a Celgard 2500 support and is fully water swelled. The applied current is 100 μA.

DETAILED DESCRIPTION

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

To address the challenges discussed above, disclosed herein are methods for synthesizing halogen-free AEMs that demonstrate improved performance in alkaline batteries. The synthetic strategies outlined here include synthesis of a family of tertiary amine-containing polymers, synthesis of halogen-free alkylating agents, and reaction conditions for producing AEMs/polymer electrolytes. The polymer electrolytes of different chemistry have unique ion/mass transport properties, and when used as individual electrolytes in alkaline batteries such as Ag—Zn, they demonstrate improved performance over similar materials prepared by traditional quaternizing agents that alkylate but introduce halide. Further, the AEMs can be used in combination, leveraging their distinct transport behavior to prevent the unwanted migration of electrode materials throughout the cell, one of the largest challenges facing alkaline Zn batteries.

In a typical application, styrenic monomers bearing pendant tertiary amines (e.g., dimethylamine) are copolymerized with a crosslinking agent (e.g., divinylbenzene). These copolymers can be made via traditional bulk free-radical polymerization techniques to yield either freestanding films or films supported within porous substrates. These copolymers can also be synthesized via thin-film techniques including non-line-of-sight deposition protocols such as initiated chemical vapor deposition (iCVD) to yield films from 10s of nm to 10s of μm thick on planar or three-dimensional substrates. [12, 13]

Figure 1A:
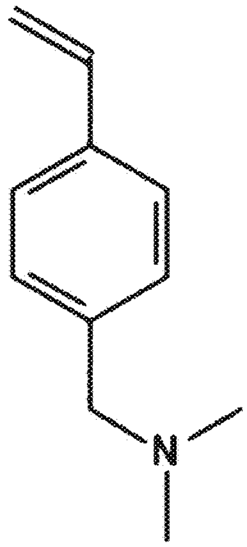
FIGS. 1A-E show compounds used in the methods disclosed herein.
Figure 1B:
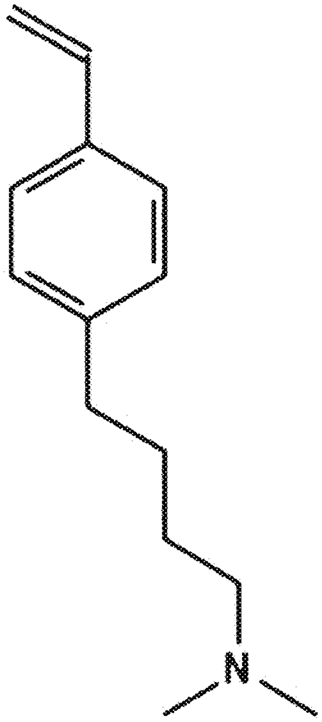
Figure 1C:
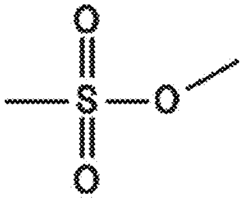
Figure 1D:
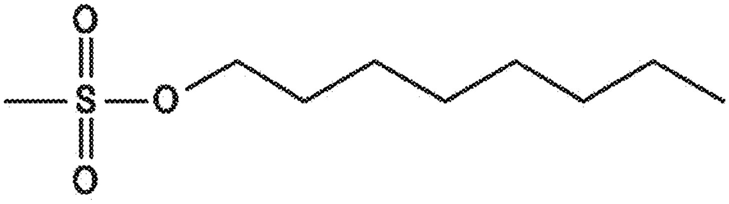
Figure 1E:
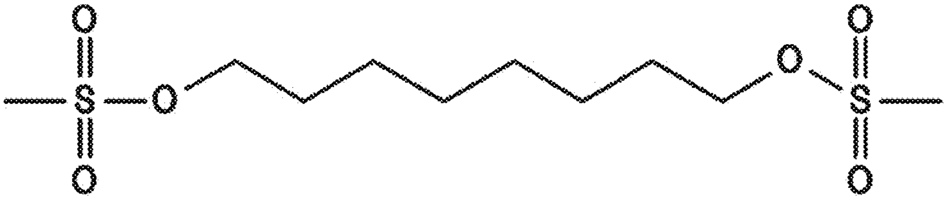
Figure 2A:
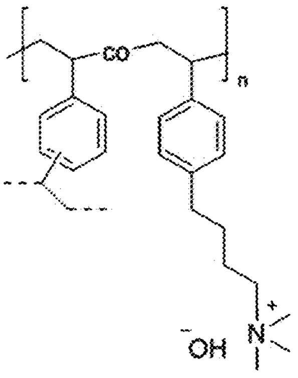
FIGS. 2A-F show a selection of quaternized divinylbenzene (DVB)-dimethylaminomethyl/butyl styrene (DMAMS/DMABS) copolymers in hydroxide anion form.
Figure 2B:
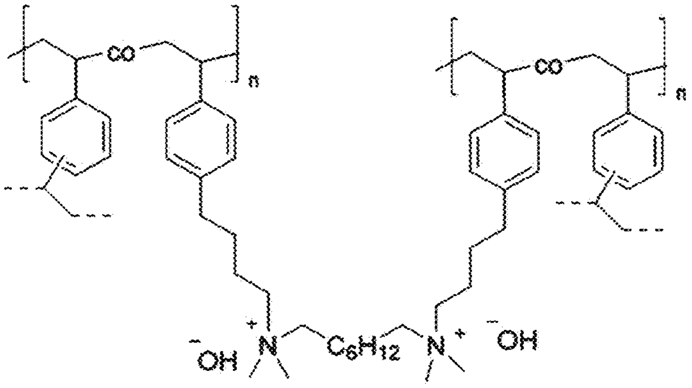
Figure 2C:
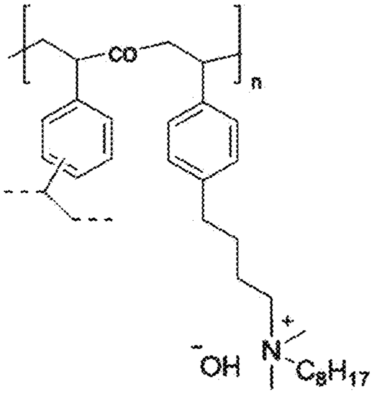
Figure 2D:
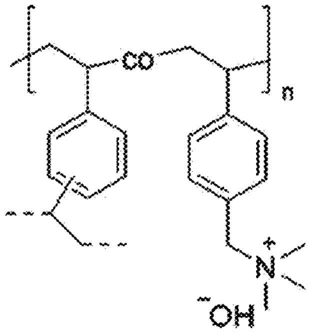
Figure 2E:
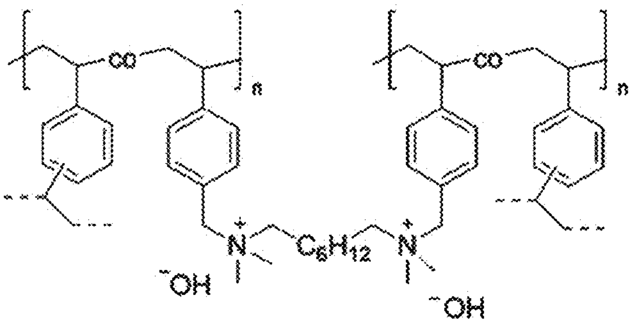
Figure 2F:
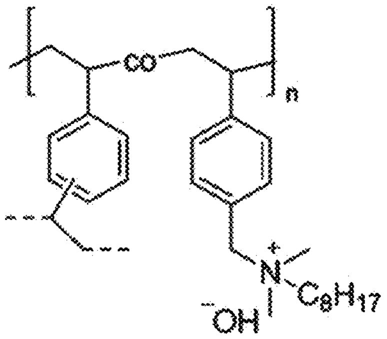

In all cases, the copolymer films are subsequently quaternized with a halogen-free alkylating agent to yield a polymer electrolyte. The alkylating agents may be mono- or multifunctional, with reactive methanesulfonate head group (s) that attach an alkyl R group to the tertiary amine to yield a QA. The R group may be as short as a single carbon or longer, with multifunctional alkylating agents linking together QA groups. Two styrenic tertiary amine monomers and three halogen-free alkylating agents are shown in FIGS. 1A-E. The compounds FIGS. 1A and 1C are available commercially. After alkylation, the polymer electrolyte is washed with $MOH_{(aq)}$ (where M is an alkali metal) to convert the films to hydroxide (OH$^-$) anion form, then rinsed with deionized water to remove residual $MOH_{(aq)}$. The amine-containing copolymers and alkylating reagents can be combined in different permutations to yield at least six distinct AEM compositions, shown in FIGS. 2A-F. The resulting hydroxide-containing polymer electrolytes are swelled with water and subsequently applied as quasi-solid-state electrolytes for alkaline batteries (e.g., Zn—Ag).

The monomer dimethylaminomethylstyrene (herein referred to as DMAMS) has been documented in the literature and used in iCVD to prepare polymer films. [14] Typically, poly-DMAMS films are used in their neutral as-synthesized state, primarily for antimicrobial applications, although recently the quaternized form of this polymer has been synthesized for alkaline batteries. [2,12,13] The primary downside of quaternized DMAMS is the relatively poor alkaline stability of this group. [15] As well documented in the literature, increasing the length of the alkyl chains connecting the quaternary ammonium to the styrenic backbone enhances the alkaline stability of the resulting polymers. [1] Also disclosed herein is the preparation and use of dimethylaminobutylstyrene (herein referred to as DMABS) as an alternative to DMAMS for the preparation of these alkaline battery polymer electrolytes.

Successful synthesis of the various polymer electrolytes is confirmed with the use of attenuated total internal reflectance-Fourier transform infrared spectroscopy (ATR-FTIR, FIG. 3A) and X-ray photoelectron spectroscopy (XPS, FIGS. 3B-G). The ATR-FTIR confirms synthesis of the neutral copolymers and subsequent quaternization of the amines, as corroborated by a reduction in the tertiary amine peak at 2766 $cm^{-1}$ (the intensity of which depends on the extent of quaternization) and appearance of absorbed ambient water at ~3430 $cm^{-1}$. [11,12]. Quaternization is additionally confirmed using XPS by the presence of a peak around 402 eV, characteristic of cationic nitrogen (FIGS. 3B-G). [11,12] Each composition is quaternized to a slightly different extent, depending on the favorability of uptake of the alkylating agent. Quaternary $N^+$ to tertiary N atomic ratios (ratio of 402 eV peak area to 399 eV peak area) for each composition are listed in Table 1.

TABLE 1

$N^+$/N atomic ratios for various polymer electrolytes

| Composition | $N^+$/N atomic ratio |
|---|---|
| p[DVB-DMAMS$^+$OH$^-$)] methyl | 0.37 |
| p[DVB-DMAMS$^+$OH$^-$)] octyl tail | 0.24 |
| p[DVB-DMAMS$^+$OH$^-$)] octyl linker | 0.22 |
| p[DVB-DMABS$^+$OH$^-$)] methyl | 0.35 |
| p[DVB-DMABS$^+$OH$^-$)] octyl tail | 0.28 |
| p[DVB-DMABS$^+$OH$^-$)] octyl linker | 0.42 |

Figure 4A:
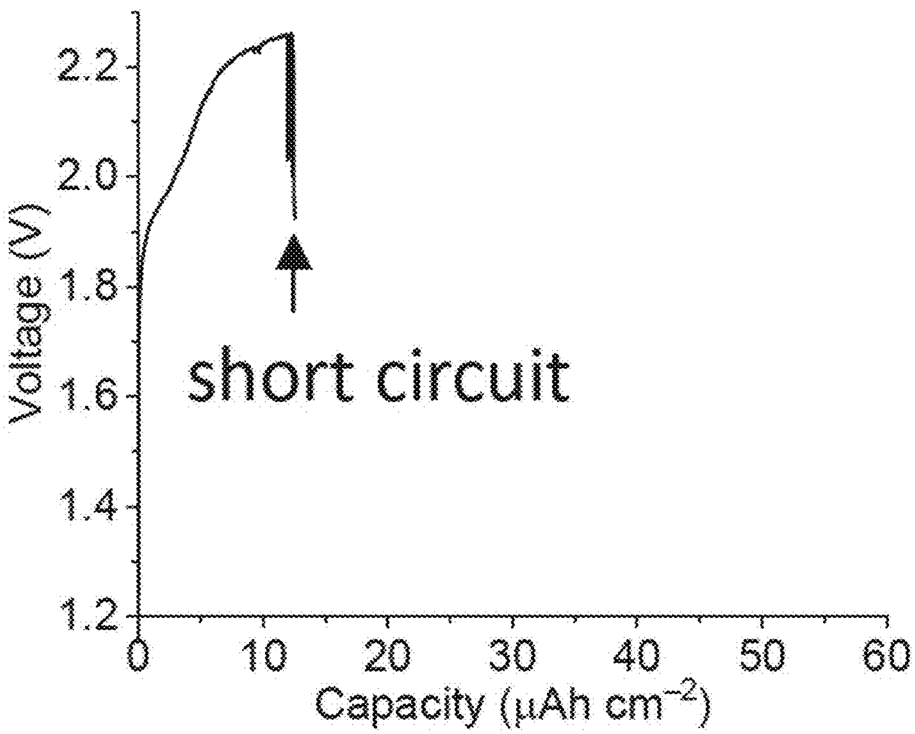
FIGS. 4A-B show galvanostatic charge and discharge of planar Ag—Zn cells using p[DVB-DMAMS$^+$(OH$^-$)]methyl synthesized with methyl iodide (FIG. 4A), methyl methanesulfonate (FIG. 4B).
Figure 4B:
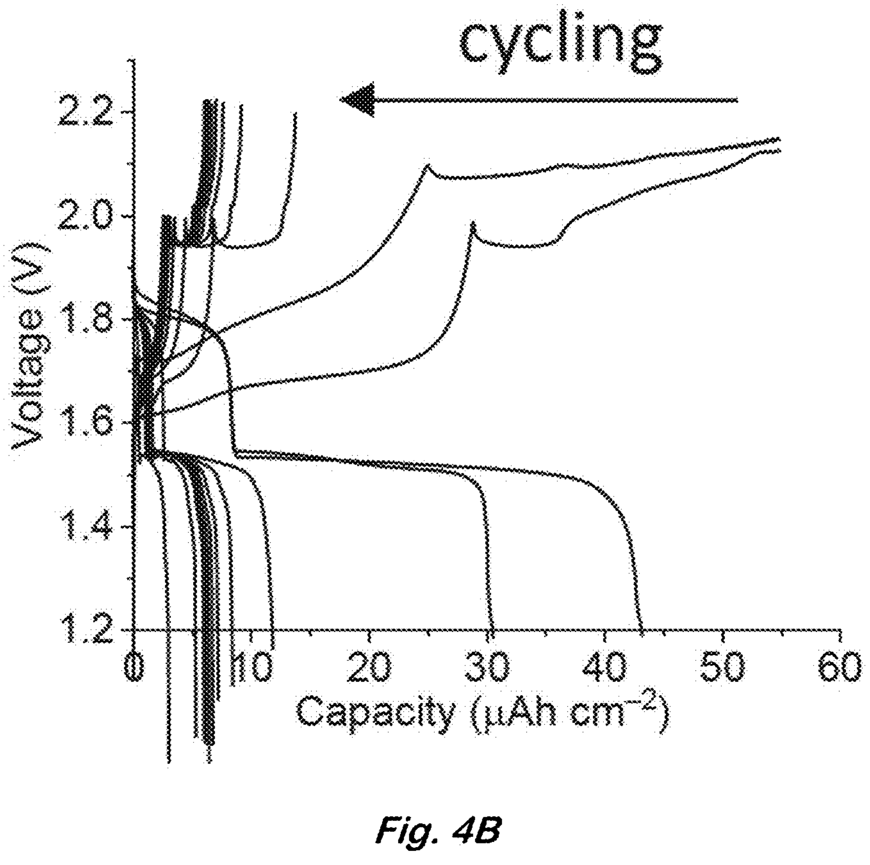
Figure 4C:
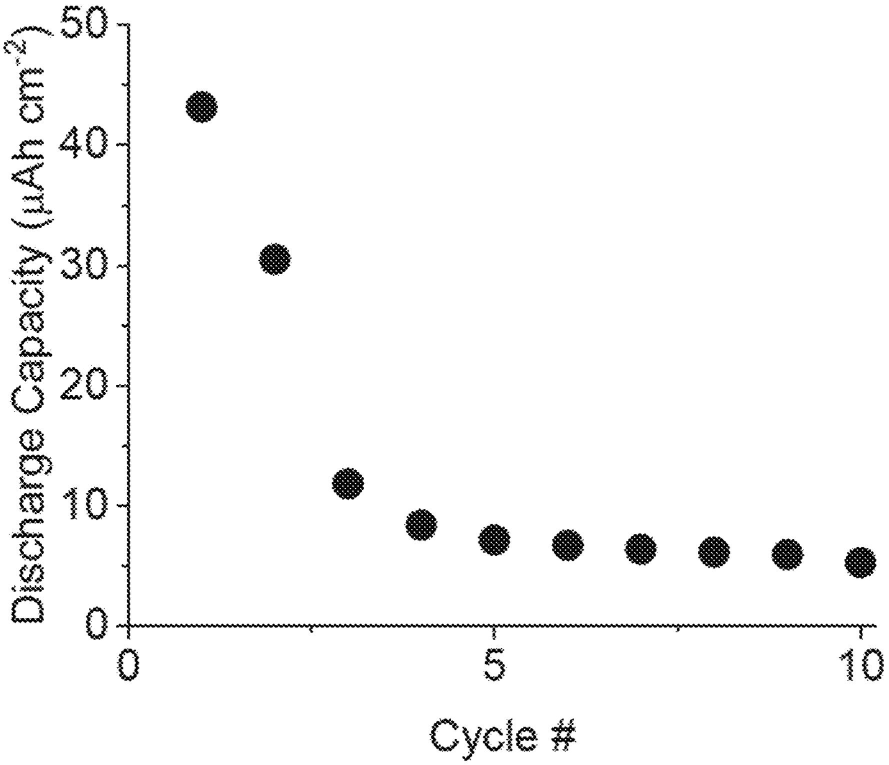
FIG. 4C shows discharge capacity per cycle for cell shown in FIG. 4B. In each experiment the polymer electrolyte is prepared within a Celgard 2500 support and is fully water swelled. The applied current is 100 PA.

Alkaline batteries using halogen-free polymer electrolytes experience significantly diminished electrode corrosion compared to those that use an electrolyte synthesized via alkyl halides. For example, planar Ag—Zn cells with a p[DVB-DMAMS$^+$(OH$^-$)] polymer electrolyte synthesized with methyl iodide (a classic alkylating agent in the AEM literature) short-circuit during their first charge cycle due to electrode corrosion and precipitation (FIG. 4A). In contrast, Ag—Zn cells that use the nominally identical p[DVB-DMAMS$^+$(OH$^-$)] electrolyte but prepared from methyl methanesulfonate can charge and discharge reversibly for numerous cycles, although they exhibit continuous loss of capacity from cycle one to cycle ten. (FIGS. 4B, C).

While low levels of residual halide are not a problem for fuel-cell operation, the ability of these halides to oxidize to the corresponding hypochlorite ($Cl^-$ to $ClO^-$, $E°_{red}$=+0.89 V), hypobromite ($Br^-$ to $BrO^-$, $E°_{red}$=+0.76 V), or iodate ($I^-$ to $IO_3^-$, $E°_{red}$=+0.26 V) under alkaline (electro)oxidative conditions enables a pathway for continual self-discharge, as the halide-oxide pair acts as a parasitic redox shuttle that can easily diffuse through the electrolyte. The $Ag_2O$—$I^-$ pair is particularly deleterious, as it is thermodynamically favorable to spontaneously disproportionate to Ag°+$IO^{3-}$ under standard conditions. Precipitation of Ag° within the polymer electrolyte eventually leads to electrical contact between the two electrodes, resulting in a short circuit and cell death. In a sealed cell used for a rechargeable battery, there is no effective way to remove these parasitic species post-assembly.

While other studies prepare AEMs/polymer electrolytes from methods that do not introduce halogens into the polymer, a majority of these protocols use either dimethyl/diethyl sulfate or a zwitterionic compound. [16-32] Only one example of prior work was found that describes the presence of halogen within the polymer as deleterious. [23]

Figure 5:
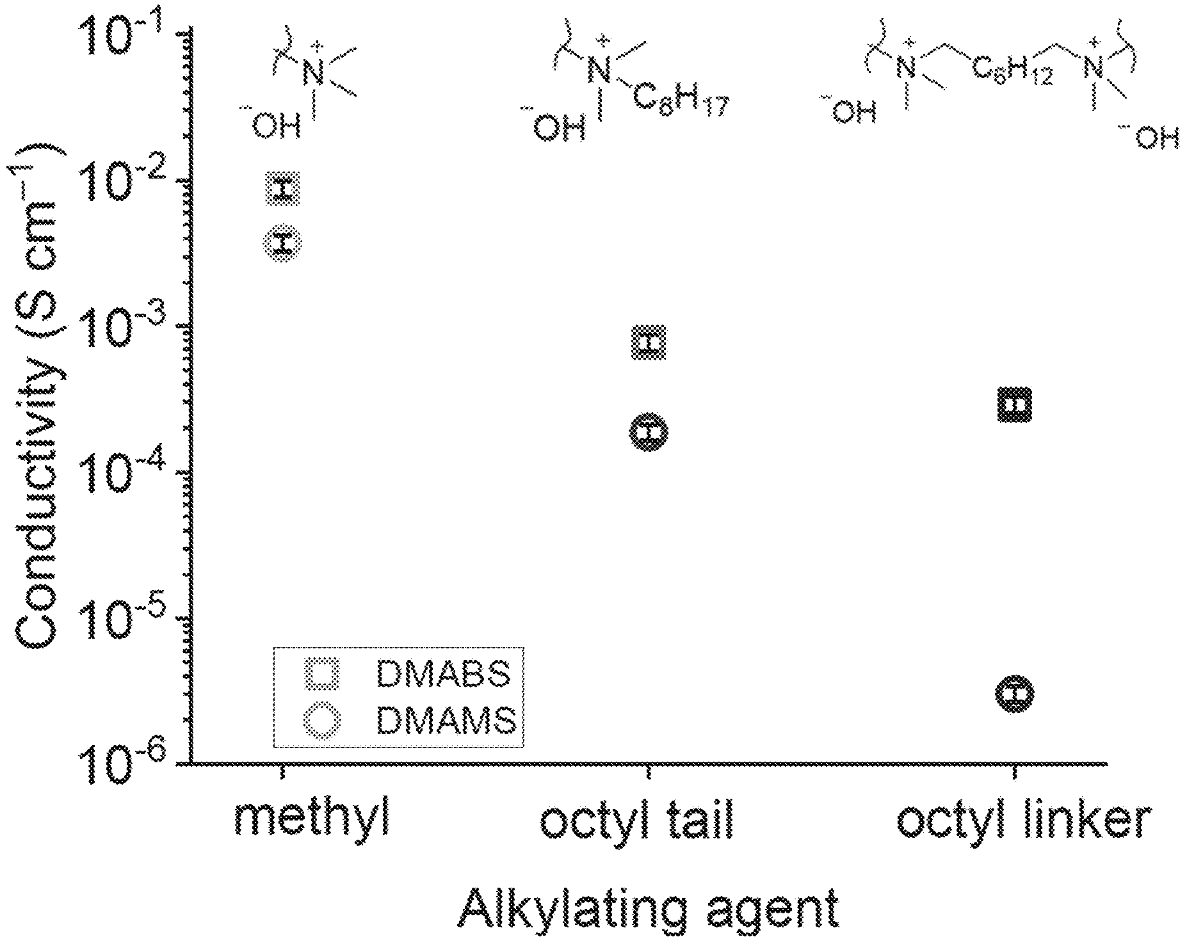
FIG. 5 shows ionic conductivity of p[DVB-DMAMS$^+$(OH$^-$)] and p[DVB-DMABS$^+$(OH$^-$)] electrolytes as a function of alkylating agent. Polymers are supported in Celgard 2500 substrates, and are water equilibrated and OH$^-$ exchanged.

Ionic conductivity is a measurement of the rate of ion transport within an electrolyte in response to an electric field, a critical performance metric for battery operation. Electrolytes with higher conductivity enable cells with higher power and rate capability. The ionic conductivity for six of the polymer electrolytes is shown in FIG. 5. Copolymers synthesized using the DMABS monomer are more ionically conductive for all alkylating agents used. This improvement is attributed to the increased dynamic freedom of DMABS QAs relative to DMAMS QAs, imparted by the butyl spacer relative to the methyl. The improved ionic conductivity is one demonstrated utility of the DMABS monomer.

Figure 6A:
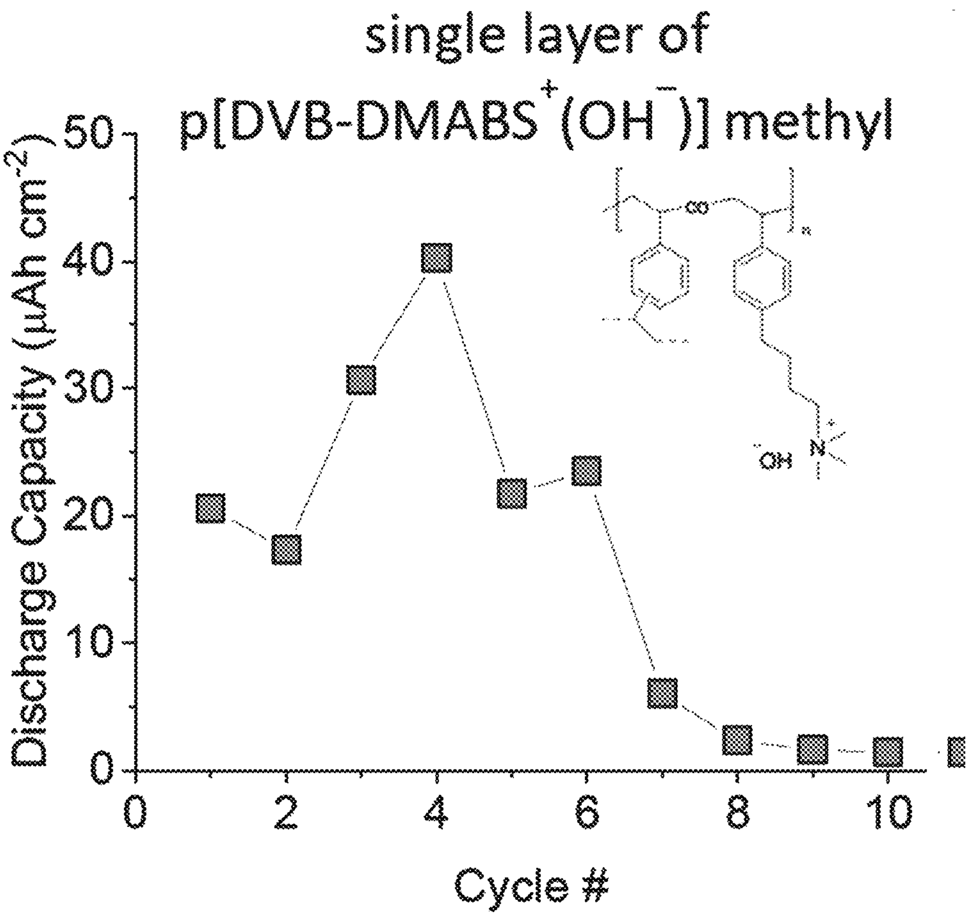
FIGS. 6A-C show galvanostatic charge and discharge of planar Ag—Zn cells with different electrolytes.
Figure 6B:
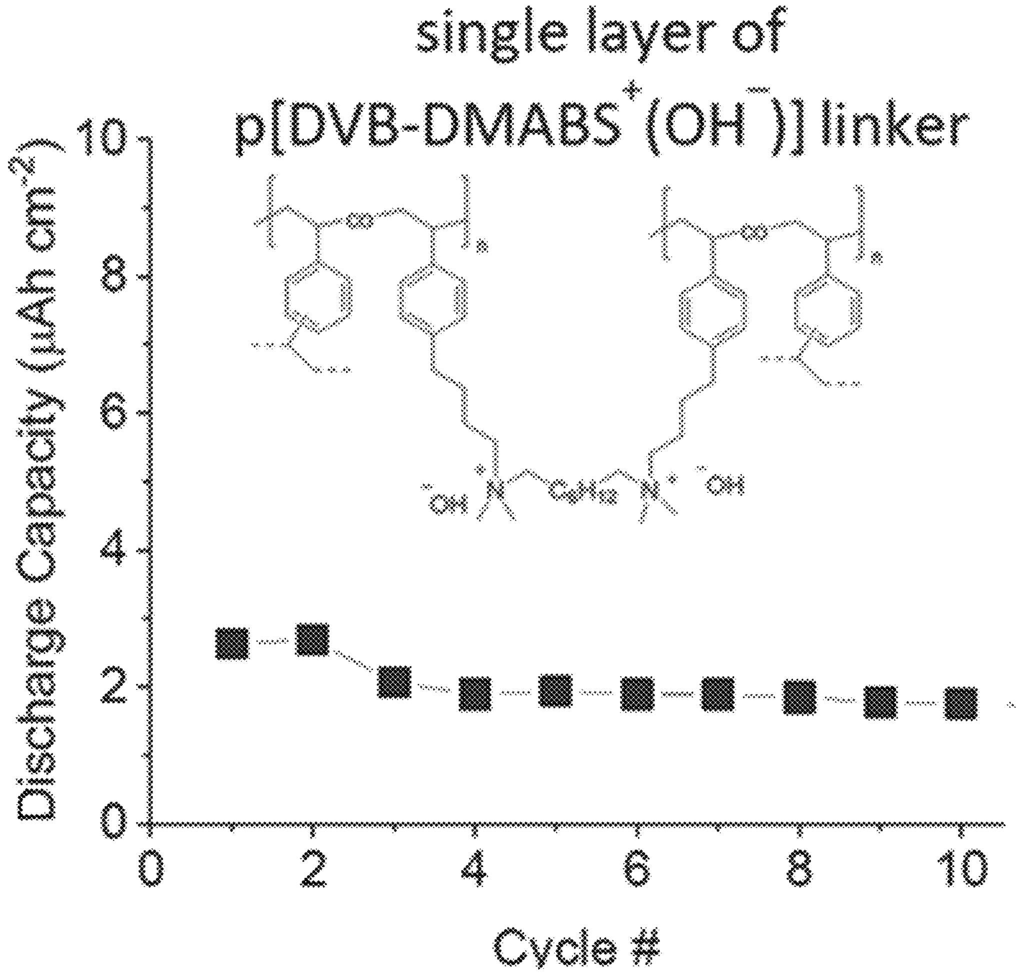
Figure 6C:
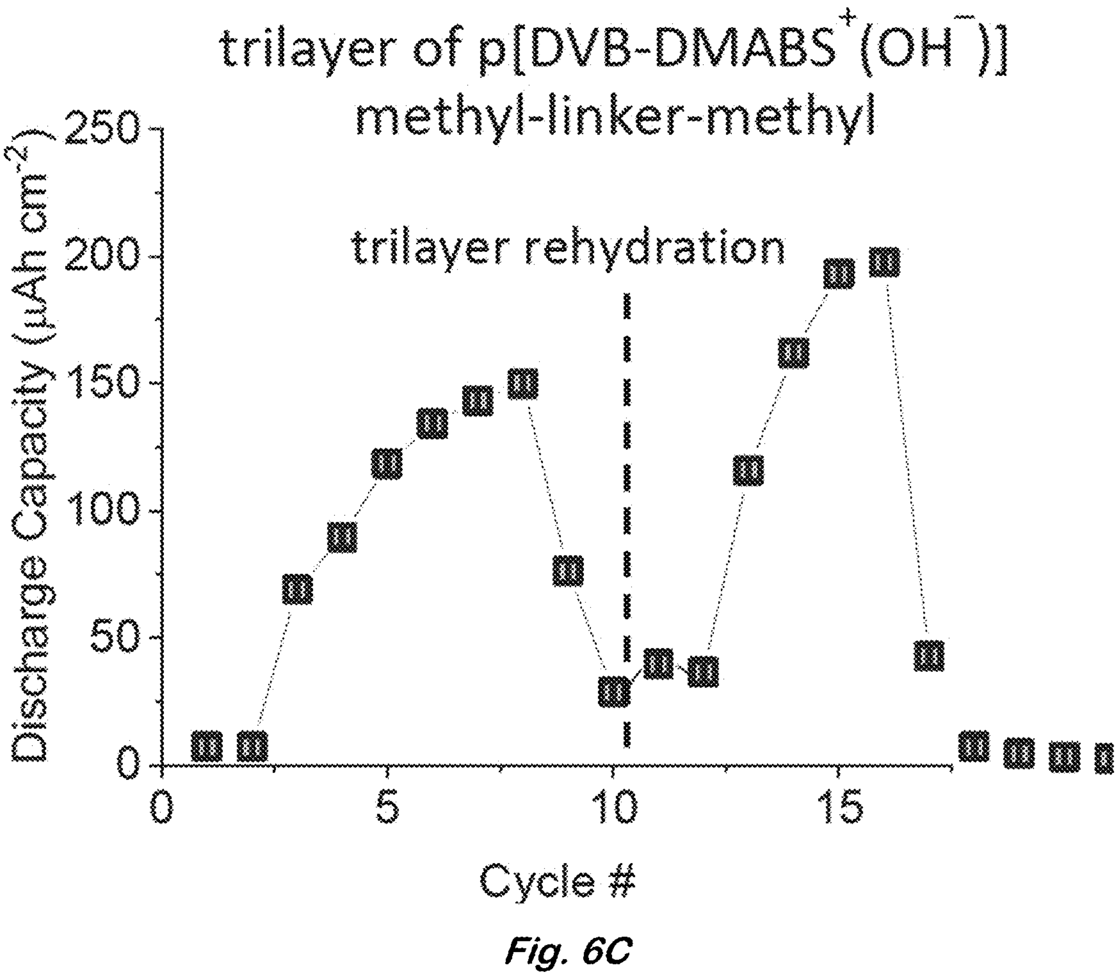

Although the halide-free AEMs deliver improved performance in capacity and cycle-life via reduced Ag precipitation in the membrane (FIG. 6A), the highly oxidative $Ag_2O$ and AgO formed on the cathode during cell charging still lead to eventual precipitation of Ag° within some of the polymer electrolytes, depending on composition. Other polymer electrolyte compositions completely prevent Ag precipitation, however Ag—Zn cells using these electrolytes have comparatively lower cell capacity (FIG. 6B). By combining different polymers into a multi-layer electrolyte, the benefits of each composition can be realized (FIG. 6C).

By possessing higher ionic conductivity and apparently higher redox intermediate product solubility, the p[DVB-DMABS$^+$(OH$^-$)]methyl composition enables facile redox reactions at the Ag and Zn electrodes, resulting in high capacity. The p[DVB-DMABS$^+$(OH$^-$)] octyl linker composition, placed in the middle of the trilayer, maintains suitable $OH^-$ transport but prevents migration of Ag and dissolved Ag complexes from the Ag electrode to the Zn electrode. The life-span and capacity of cells using this electrolyte configuration is limited only by the continued hydration of the electrolyte. As the electrolyte dries, due to either water evaporation or consumption via water electrolysis, the capacity decreases. Re-swelling the trilayer electrolyte with water results in recovery of capacity. The average coulombic efficiency of the trilayer Ag—Zn cell, defined as the ratio of the capacity delivered on discharge to the capacity required to reach the cutoff charge potential, is about 85%.

While multilayer electrolyte configurations are not uncommon in alkaline batteries, especially in the case of Ag—Zn batteries [33], the electrolytes used here are unique in that they block Ag migration through a non-sacrificial means. The classic separator/electrolyte component used in Ag—Zn batteries, cellophane/cellulose, decreases solubilized Ag cross-over by oxidizing chemical groups present on the membrane. [33] This reaction is irreversible, and once all the active groups on the membrane have been exhausted, Ag can freely migrate through the electrolyte to the Zn electrode.

Figure 7A:
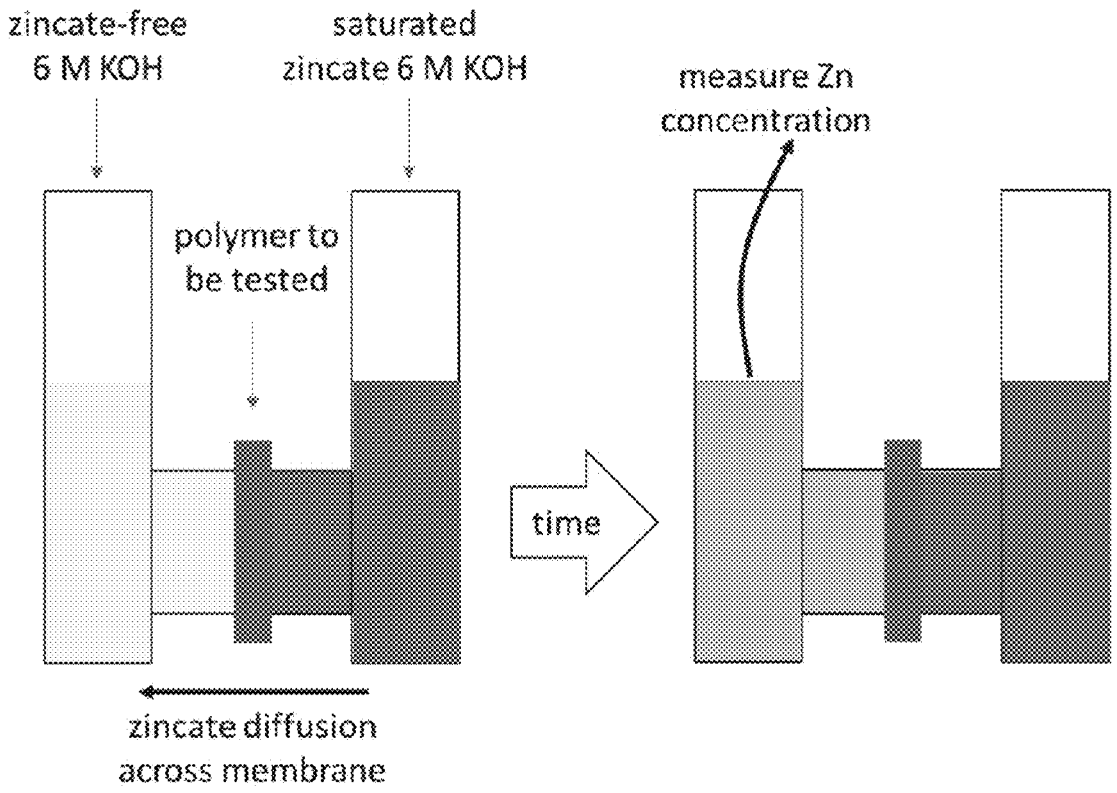
FIG. 7A shows a schematic depicting zincate diffusion experiment (adapted from [2]).
Figure 7B:
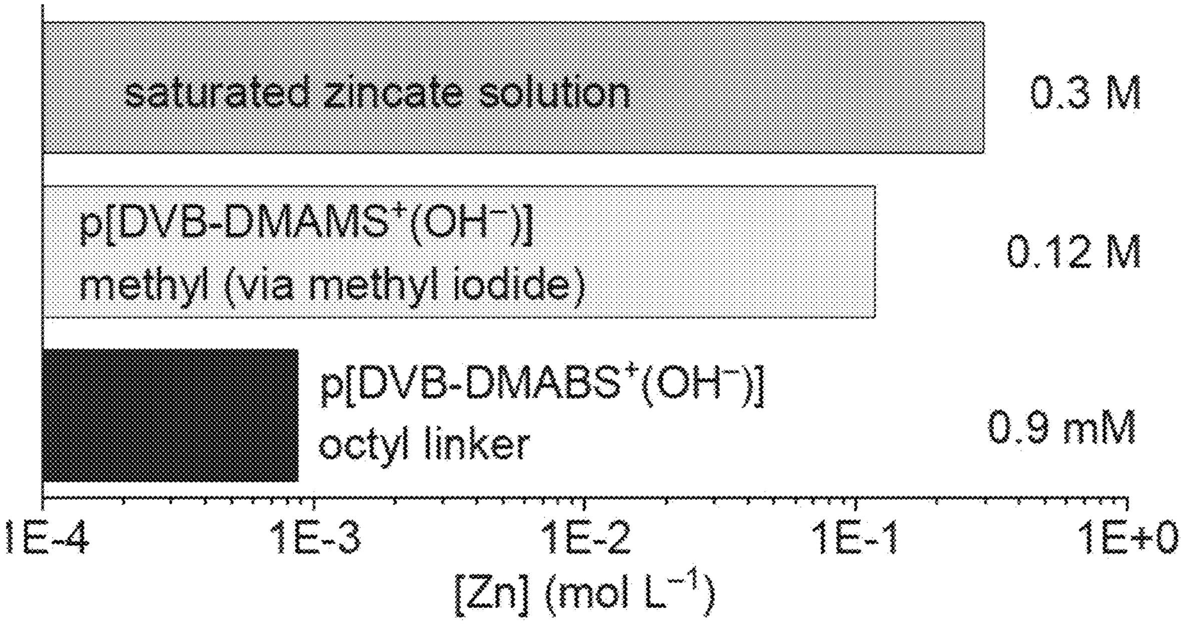
FIG. 7B shows Zn concentration of initial saturated zincate solution and diffusion solutions of p[DVB-DMAMS$^+$(OH$^-$)]methyl (via methyl iodide) and p[DVB-DMABS$^+$(OH$^-$)] octyl linker after 24 h. Polymer electrolytes are prepared within Celgard 2500 support.

Within most alkaline Zn batteries, another major concern is the migration of Zn in the form of dissolved zincate (e.g., $Zn(OH)_4^{2-}$). When zincate migrates from the Zn anode to the opposing cathode, it can react with the cathode active material and cause electrode shape change and loss of capacity. [34] Using diffusion-cell experiments, where two solutions of zincate-saturated 6 M KOH and zincate-free 6 M KOH are separated by a polymer electrolyte, the ability of the polymer to prevent zincate diffusion can be evaluated in an environment comparable to that found within commercial alkaline batteries. It was previously shown that zincate can freely move through the polymer electrolyte compositions p[DVB-DMAMS$^+$($OH^-$)]methyl (synthesized from methyl iodide). Here, it is demonstrated that, likely due to polymer microstructure, under the same conditions p[DVB-DMABS$^+$($OH^-$)] octyl linker reduces Zn migration by over 99% over a 24 h experiment. (FIG. 7). As p[DVB-DMABS$^+$($OH^-$)] octyl linker conducts $OH^-$, but rejects zincate, it can see immediate use within commercial alkaline Zn cells and next-generation rechargeable Zn-air batteries where zinc migration is an issue. Implementation would improve the capacity retention and life-cycle of alkaline Zn batteries.

A copolymer as disclosed herein may be made by copolymerizing a divinylbenzene and a dimethylaminoalkylstyrene having the formula below, via radical polymerization of the vinyl groups, to form an amine copolymer. R is an n-alkylene group. Suitable R groups include, but are not limited to, methylene and n-butylene. The divinylbenzene may be o-, m-, or p-divinylbenzene. As used herein, any phenyl group may have other substituents in place of hydrogen atoms.

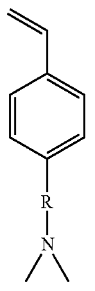

Any copolymerization method may be used. One suitable method is bulk polymerization. Another suitable method is initiated chemical vapor deposition onto a porous 2D or 3D substrate. In either case or with other methods, a porous 3D structure, such as an electrode or membrane, may be permeated with the divinylbenzene and the dimethylaminoalkylstyrene before initiating polymerization. For example, the membrane may be filled with a mixture of liquid or dissolved monomers before polymerization. Alternatively, the membrane may be permeated with vapors of the monomers. Upon initiation, the copolymer is deposited on the surfaces of the pores. The pores need not be completely filled with the copolymer.

The amine copolymer is then reacted with a sulfonate compound having the formula $CH_3—SO_2—O—(CH_2)_n—(O—SO_2)_m—CH_3$ or another alkylating agent to form a quaternary amine copolymer. The value m is zero or one, and n is a non-negative integer when m is zero and a positive integer when m is one. Example sulfonate compounds are shown in FIG. 1C (m=0, n=0), ID (m=0, n=7), and 1E (m=1, n=8). It is to be understood that not all of the tertiary amine groups are required to be converted to quaternary amine groups. Any description herein of a polymer having quaternary amines may also include the corresponding tertiary dimethylamine, even in substantial amounts.

The quaternary amine copolymer is then reacted with NaOH to form a copolymer of the divinylbenzene and a quaternary amine monomer. It is be understood that any description herein of a copolymer of monomers does not imply that the copolymer must be made by direct copolymerization of those monomers. The description is of the copolymer structure and not necessarily of its making and includes any method of producing the described copolymer structure.

When m is zero, the quaternary amine monomer has the non-linked structure below. Example values of n include, but are not limited to, 0 and 7.

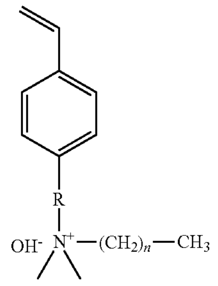

When m is one, the quaternary amine monomer has the linked structure below. The copolymer may include some unlinked moieties that were not converted to quaternary amines. Example values of n include, but are not limited to, 7. Since this structure has two vinyl groups, it may act as a crosslinker. It is to be understood that the copolymer may include linked quaternary amines with one or two polymerized vinyl groups in any proportion.

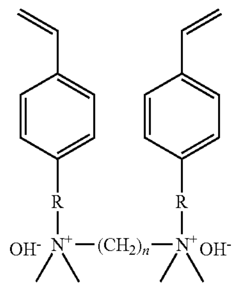

The porous membrane with the copolymer therein may be used as a separator of a battery. The separator is positioned between an anode and a cathode. Methods of producing such batteries are known in the art. Example anode materials include, but are not limited to, zinc, and example cathode materials include, but are not limited to, silver. As used herein, oxides of silver and zinc are also included.

In one embodiment, the battery separator has three stacked layers. The center or inner layer has a linked quaternary amine, such as where R is n-butylene and n is 8. The two outer layers have a non-linked quaternary amine, such as where R is n-butylene and n is 0.

The polymer electrolytes disclosed within provide multiple advantages for rechargeable alkaline Zn batteries. The disclosed monomer DMABS enables synthesis of alkaline polymer electrolytes with improved ionic conductivity relative to other similar electrolytes and is compatible with a wide variety of electrolyte synthesis techniques including thin-film deposition. The disclosed methods of halide-free amine quaternization yield polymer electrolytes that avoid electrode corrosion thereby increasing cycle-life. The synthesis of p[DVB-DMABS$^+$($OH^-$)] octyl linker and its use in a trilayer electrolyte configuration prevents the migration of Ag in Ag—Zn cells, and the migration of zincate more broadly in alkaline Zn cells, thereby extending cell capacity retention.

The thickness of the polymer film is not restricted; for demonstration purposes, Celgard 2500 (25 μm thick) was chosen to provide a fixed-thickness, thin support. The electrolytes may be thin (e.g., 10 nm) so long as they are pinhole-free, or they can be thick (e.g., 1 mm) so long as they exhibit sufficient hydroxide conductivity for effective operation at the desired rate of (dis)charge. The polyelectrolyte separator may be a homopolymer or copolymer of any number of components not limited to divinylbenzene as the secondary component and need not be embedded in an inert support such as Celgard. The (co)polymer need not be physically or chemically crosslinked, although light cross-linking is suggested to improve mechanical integrity and limit swelling. The composition of the separator may be graded along its thickness, and its microstructure may be either homogeneous or heterogeneous (e.g., a microphase-separated block copolymer). The polyelectrolyte separator may be sealed with a fixed amount of water of hydration, in equilibrium with water vapor or liquid water, or even in equilibrium with aqueous alkali (e.g., KOH(aq)). Nonaqueous plasticizers (e.g., ethylene glycol) may also be used as an alternative, or in addition, to water. The polymer need not be deposited by bulk polymerization; alternatives include initiated chemical vapor deposition (iCVD) of the (co) monomers directly onto anode/cathode and spin coating/drop casting of soluble (non-crosslinked) polymer from solution onto the substrate.

Anode and cathode geometries are not limited. Planar Zn and Ag foil electrodes were chosen for simplicity, but the disclosed polymer electrolytes may be used in conjunction with architected (2D or 3D) electrodes in equivalent fashion. Cathode compositions are likewise not limited to $Ag_2O$; common alternatives include $MnO_2$ and NiOOH either as pure compounds, mixed with the associated metal, or as part of more complex composite electrodes, including electrode structures catalyzed to perform oxygen reduction and/or oxygen evolution.

Other non-halogen-containing alkylation agents can be used. These include such compounds as methyl trifluoromethylsulfonate (a.k.a. methyl triflate), methyl toluenesulfonate (a.k.a. methyl tosylate), and methyl fluorosulfonate (a.k.a. 'magic' methyl), among others. These alkylating agents must be strong enough to quaternize a tertiary amine and water-soluble enough to be removed as the metal salt on MOH(aq) washing. The length and/or chemical composition of the R group attached to the ammonium via quaternization is not restricted; the R group can be of any length or contain other chemical groups as desired.

Other dialkylaminoalkyl styrenes can be envisioned as alternatives to DMAMS (dimethylaminomethyl styrene) and DMABS (dimethylaminobutyl styrene) and synthesized in equivalent manners to DMABS from commercially available precursors (e.g., chain extension of chloromethyl styrene or bromostyrene with a dihaloalkane via Grignard reagent, followed by reaction of the resulting haloalkyl styrene with dialkylamine). Alternative to dialkylaminoalkyl styrenes, one could envision alternative tertiary amine-terminated alkylstyrenes such as tetramethylguanidyl alkylstyrene or imidazolyl alkylstyrene prepared by action of tetramethylguanidine or imidazole on the corresponding haloalkyl styrene instead of simple dialkylamine.

The following examples are given to illustrate specific applications. These specific examples are not intended to limit the scope of the disclosure in this application.

Synthesis of 4-dimethylaminomethyl styrene (DMAMS)—Dimethylamine (40 wt. % in water) (250 mL, 1.98 mol), $K_2CO_3$ (53.99 g, 0.391 mol), and a magnetic stir bar were added to a 500 mL round-bottom flask and chilled to 0° C. in an ice bath. An addition funnel was attached to the flask to which 58.17 g (0.381 mol) of 1-(chloromethyl)-4-vinylbenzene (VBC) was added after filtration through a plug of neutral alumina to remove the t-butylcatechol inhibitor. Neat VBC was added dropwise to the stirring aqueous dimethylamine solution under $N_2$ flow forming a pale yellow emulsion that was stirred for 16 h and allowed to warm slowly to room temperature. Volatiles (e.g., excess dimethylamine) were subsequently removed under vacuum at ambient temperature causing the emulsion to separate into a colorless aqueous lower layer and yellow organic upper layer. The organic layer was separated and the aqueous layer was washed several times with ethyl acetate. The multiple organic fractions were combined and washed several times with deionized water, dried over magnesium sulfate, and concentrated in vacuo. The crude yellow oil was vacuum distilled at 100° C. then filtered through neutral alumina to remove colored impurities (e.g., trace inhibitor that had carried over during distillation). 4-Dimethylaminomethyl styrene (4-DMAMS) was isolated as a colorless oil (49.98 g, 81% yield).

Synthesis of 4-dimethylaminobutyl styrene (DMABS)—30 mL of dry diethyl ether was charged in a 250 mL three-neck flask. Magnesium turnings (1.91 g, 78.6 mmol) were placed in the flask with a crystal of iodine under nitrogen atmosphere. The solution was placed in an ice bath and allowed to stir. Under nitrogen, an addition funnel was fitted to the three-neck flask. 30 mL of diethyl ether in which vinylbenzyl chloride (9.2 mL, 65.5 mmol) was dissolved were added to the addition funnel. The solution was added dropwise to the flask over the course of an hour. Once the addition was complete, the flask was removed from the ice bath and allowed to stir at room temperature for an additional hour until most of the magnesium turnings were dissolved.

To a separate 500 mL three-neck flask, 250 mL of dry tetrahydrofuran (THF) and 7.0 mL 1-bromo-3-chloropropane (11.14 g, 70.8 mmol) were added under flowing nitrogen along with $CuCl_2$ (88 mg, 0.655 mmol) and LiBr (113.7 mg, 1.31 mmol). An addition funnel was placed on the flask and the magnesium solution was carefully decanted into the addition funnel under the flow of nitrogen. The flask was placed in an ice bath and the magnesium solution was added dropwise. The reaction was allowed to stir overnight. The reaction was subsequently quenched with 10 mL of methanol and volatiles were removed via rotary evaporation. The solution was then extracted with ethyl acetate, water, and brine. Volatile organics were removed via rotary evaporation and the crude intermediate product isolated as a yellow oil (7.2 g, 56.47% yield).

Figure 8:
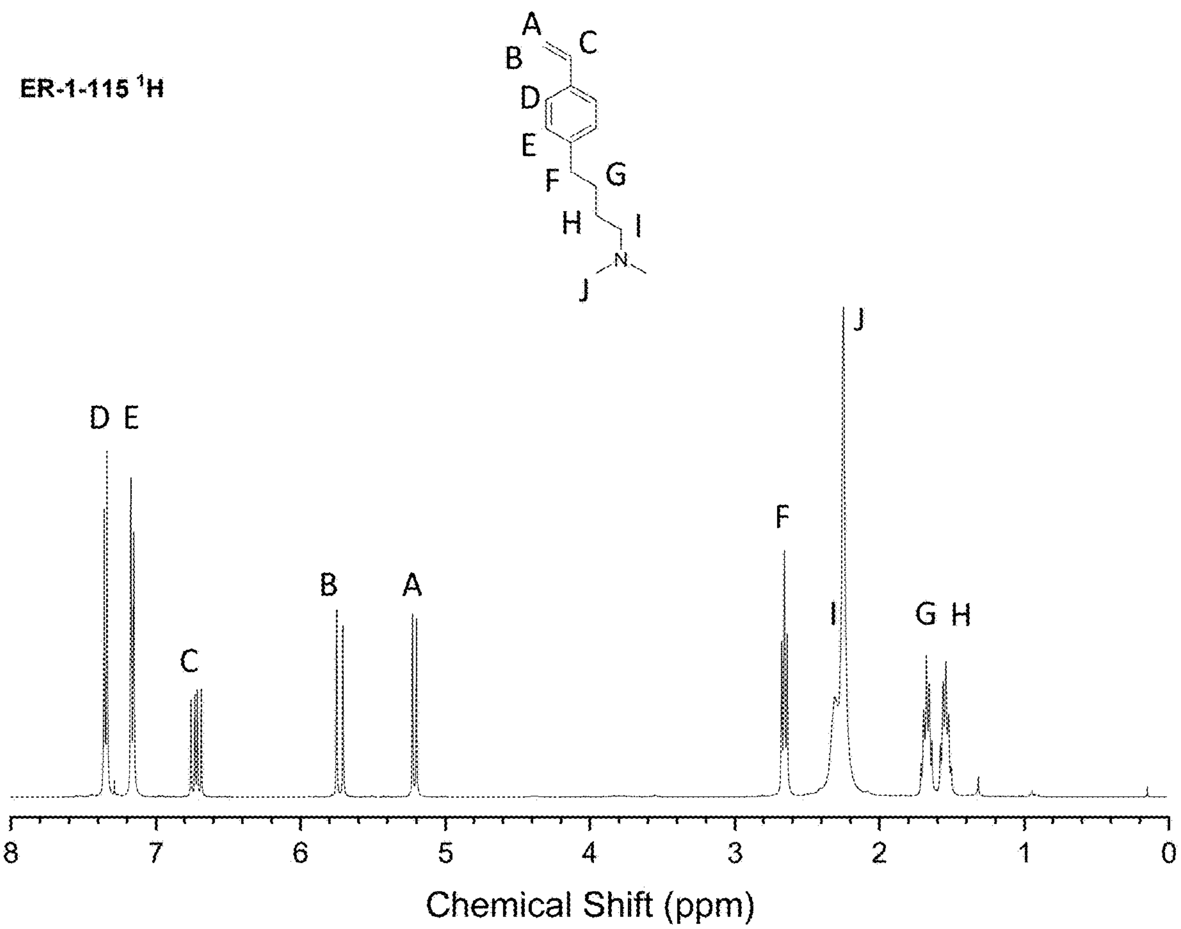
FIG. 8 shows an NMR spectrum of DMABS.

In a 50 mL round-bottom flask, excess aqueous dimethylamine (40 wt. %) was placed in an ice bath under nitrogen. Potassium hydroxide pellets (2.38 g, 42.4 mmol) were added to the solution and stirred until dissolved, forming a two-phase mixture. The crude yellow oil (7.2 g, 37 mmol)

isolated from the previous step was added dropwise to the solution under nitrogen and the reaction left to stir overnight. The final product was purified via silica-gel column chromatography using triethylamine-deactivated silica with 100% hexanes, then 3:1 hexane/ethyl acetate, and finally 1:1 hexane/ethyl acetate. 4-Dimethylaminobutyl styrene was isolated as a colorless oil (3.6 g, ~50% yield from intermediate). FIG. 8 shows an NMR spectrum of the product.

Synthesis of 1,8-bis-(methanesulfonyl)octanediol (octyl linker)—In a typical reaction, a 100 mL round-bottom flask was charged with a stir bar, triethylamine (2.07 g, 20.5 mmol), along with 1,8-octanediol (1 g, 6.83 mmol), and 30 mL dichloromethane. The flask was sonicated until the diol had completely dissolved. The reaction was then placed in an ice bath at 0° C. and left to stir for 10 min. Methylsulfonyl chloride (2.35 g, 20.5 mmol) was added to the reaction and left to stir for 1 h, after which it was removed from the ice bath and allowed to stir at room temperature for 2 h. The solution of crude product was filtered to remove solids and the solvent was removed in vacuo. The crude product was further purified through a series of extractions using dichloromethane and a bicarbonate solution to remove HCl formed during the reaction, followed by a water and then a brine extraction. The organic solution was then concentrated under vacuum to produce a yellow oil that slowly crystallizes (1 g, 50% yield).

Synthesis of n-octyl methanesulfonate (octyl tail)—In a typical reaction, a 50 mL round-bottom flask was charged with a stir bar, triethylamine (2.32 g, 23.0 mmol), 1-octanol (1 g, 7.67 mmol), and dichloromethane (30 mL). The reaction was placed in an ice bath at 0° C. and allowed to stir for 10 min before methanesulfonylchloride (1.32 g, 11.5 mmol) was added to the reaction and left to stir for 1 h, after which the reaction was removed from the ice bath and allowed to stir at room temperature for 2 h. The solution of crude product dissolved in dichloromethane and washed with a bicarbonate solution to remove HCl formed during the reaction, followed by a water and then a brine extraction. The organic solution was then concentrated under vacuum to produce an orange oil. (1.3 g, 81% yield).

Polymerization of p[DVB-DMABS] within Celgard—DMABS (0.2 g, 0.984 mmol), divinylbenzene (5 mg, 0.0384 mmol), and AIBN (5 mg, 0.0304 mmol) were placed in a 25 mL scintillation vial and sonicated to dissolve the AIBN. A sheet of Celgard 2500 was soaked with the resultant solution of monomers and initiator and placed between two Teflon sheets sandwiched between glass plates. The assembly was placed in a convection oven and held at 80° C. for 3 h to polymerize the monomers. The assembly was then removed from the oven, cooled to room temperature, and the Celgard composite peeled away from the Teflon sheets and washed with acetone to remove any unreacted monomer. The composite (neutral/uncharged) polymer membrane was set aside for quaternization.

Polymerization of p[DVB-DMAMS] within Celgard—DMAMS (0.2 g, 1.2 mmol), divinylbenzene (5 mg, 0.0384 mmol), and AIBN (5 mg, 0.0304 mmol) were placed in a 25 mL scintillation vial and sonicated to dissolve the AIBN. A sheet of Celgard 2500 was soaked with the resultant solution of monomers and initiator and placed between two Teflon sheets sandwiched between glass plates. The assembly was placed in a convection oven and held at 80° C. for 3 h to polymerize the monomers. The assembly was then removed from the oven, cooled to room temperature, and the Celgard composite peeled away from the Teflon sheets and washed with acetone to remove any unreacted monomer. The composite (neutral/uncharged) polymer membrane was set aside for quaternization.

Quaternization of p[DVB-DMAMS]/p[DVB-DMABS] with methyl methanesulfonate—A Celgard-polymer composite film prepared as described above was cut into a 1"×3" strip that was placed in a pressure reaction vessel and submerged in 5 mL of anhydrous dimethylcarbonate (DMC). The vessel was then charged with 100 μL of methylating agent (methyl iodide or methyl methanesulfonate). The reaction vessel was sealed and held at ambient temperature (23° C.) for 16 h. The polymer film was subsequently removed from the solution and washed with acetone to remove unreacted any methylating agent and DMC.

Quaternization of p[DVB-DMAMS]/p[DVB-DMABS] with octyl tail—As above, a 1"×3" strip was cut from a Celgard-polymer composite film, placed in a pressure reaction vessel, and submerged in 5 mL of DMC. The vessel was then charged with 100 μL of n-octyl methanesulfonate. The reaction vessel was sealed and held at 75° C. for 16 h. The polymer film was subsequently removed from the solution and washed with acetone to remove any unreacted n-octyl methanesulfonate and DMC.

Quaternization of p[DVB-DMAMS]/p[DVB-DMABS] with octyl linker—As above, a 1"×3" strip was cut from a Celgard-polymer composite film, placed in a pressure reaction vessel, and submerged in 5 mL of DMC. Half the molar equivalence of 1,8-bis(methanesulfonyl)octanediol versus amino groups in the composite was subsequently added to the solution. The reaction vessel was sealed and held at 75° C. for 16 h. The polymer film was subsequently removed from the solution and washed with acetone to remove unreacted 1,8-bis-(methanesulfonyl)octanediol and DMC.

Ionic exchange of methanesulfonate counterions with hydroxide—A 1 M solution of sodium hydroxide (NaOH) was prepared by dissolving NaOH pellets in 18 MΩ deionized water that had been purged of dissolved $CO_2$ by nitrogen sparging. Within a nitrogen dry box, polymer films were ion exchanged by submerging them in the degassed hydroxide solution for 24 h, with fresh solution replenishments over the course of a day to ensure maximum exchange. After the 24 h exchange, the films were washed with nitrogen sparged 18 MΩ deionized water to remove excess NaOH. The resulting hydroxide-form polymer electrolytes were stored in 18 MΩ deionized water within a nitrogen dry box until use.

Preparation of ZnO anodes and Ag cathodes—ZnO anodes were prepared by heat-treating ½" diameter zinc foil disks (99.99% Zn) at 325° C. for 1 h to grow a thin layer of ZnO on the surface of the Zn metal. [35] As-prepared ZnO anodes were stored under nitrogen until use. Planar Ag foil (99.998%) was stored in a nitrogen dry box and cut into ½" diameter disks for use.

Cell assembly and testing—Cells consisting of a ZnO anode, water-swelled polymer electrolyte supported within Celgard (monolayer or trilayer assembly), and a Ag cathode were assembled within a nitrogen dry box. The polymer electrolyte was tailored into a section slightly larger than the electrodes and used as both electrolyte and separator. A home-made cell consisting of Au current collectors, laser-cut acrylic housing, and rubber gasket allowed for consistent cell pressure and minimization of water evaporation during experiments.

For galvanostatic measurements (FIGS. 4A-B), a Gamry 620+ reference potentiostat was used to apply a constant charge or discharge current of 100 μA, with upper and lower cutoff potentials being 1.9 V—2.2 V, and 1.2 V, respectively.

For measurement of ionic conductivity, a polymer electrolyte sample was pressed between two blocking Au electrodes. Electrochemical impedance spectroscopy was conducted on the polymer electrolytes using an AC potential of 10 mV, applied over a frequency range of 10 MHz to 1 Hz. The resulting Nyquist spectra were fit using an equivalent-circuit model within the Gamry Echem Analyst software package, from which the polymer electrolyte resistance was obtained and used to calculate the ionic conductivity.

Figure 3A:
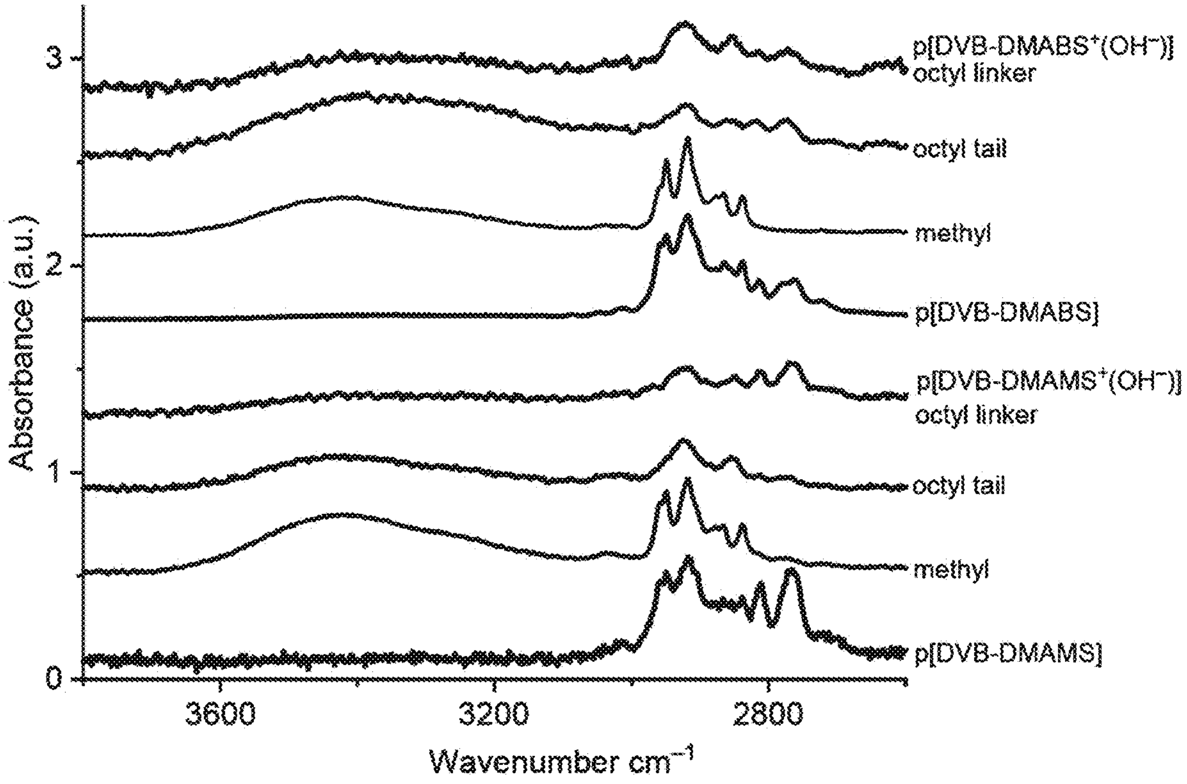
FIG. 3A shows ATR-FTIR spectra of neutral and various charged forms of p[DVB-DMAMS] and p[DVB-DMABS] copolymers.
Figure 3B:
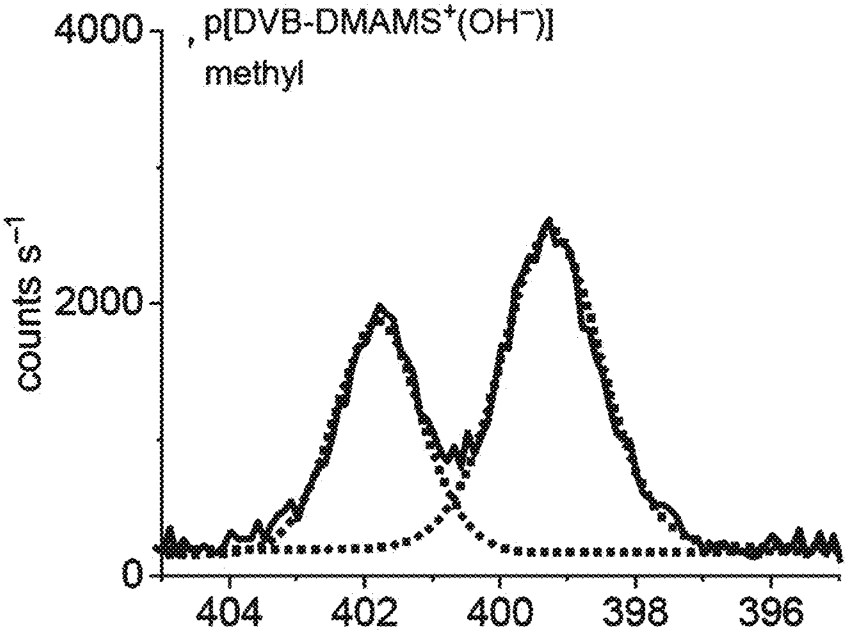
FIGS. 3B-D show nitrogen N1s XPS spectra of p[DVB-DMAMS$^+$(OH$^-$)] with methyl (FIG. 3B), octyl tail (FIG. 3C), octyl linker (FIG. 3D).
Figure 3C:
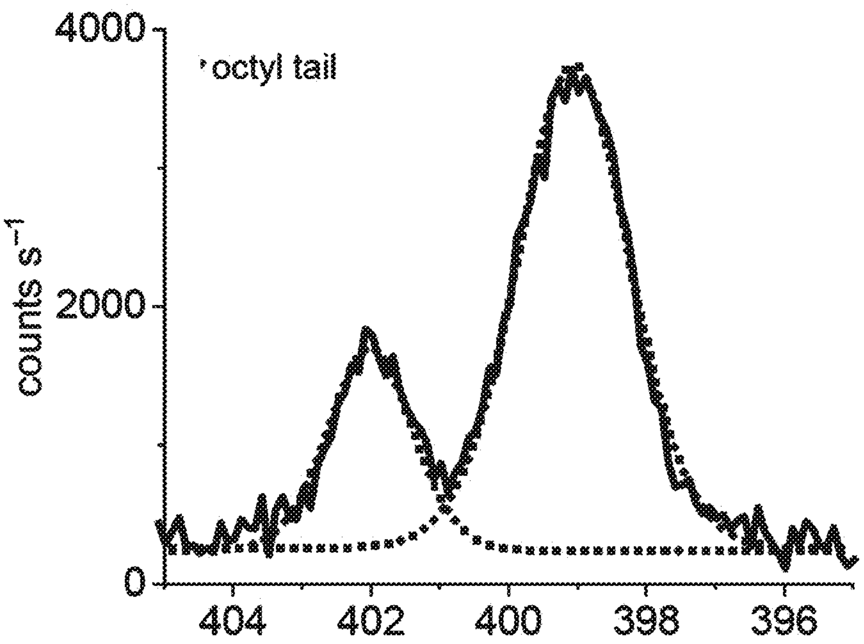
Figure 3D:
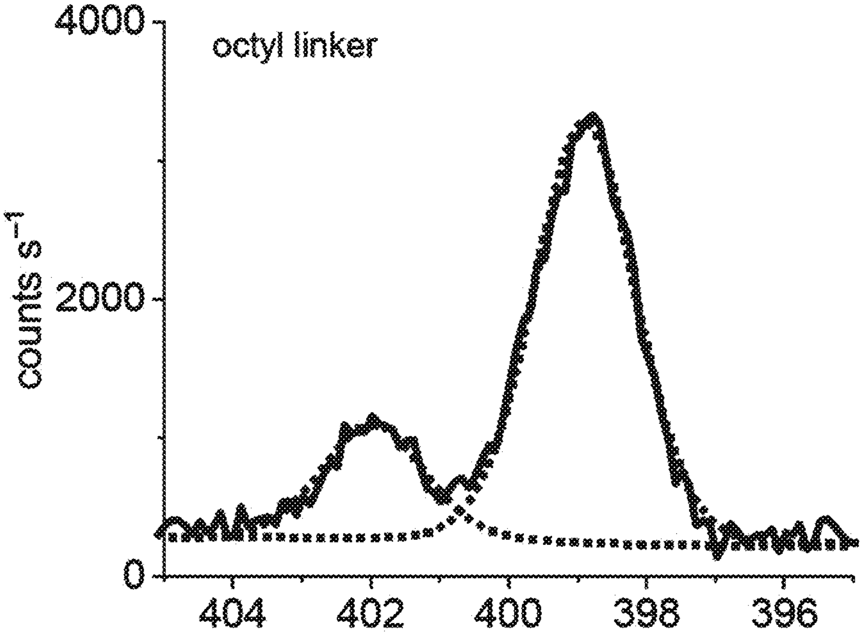
Figure 3E:
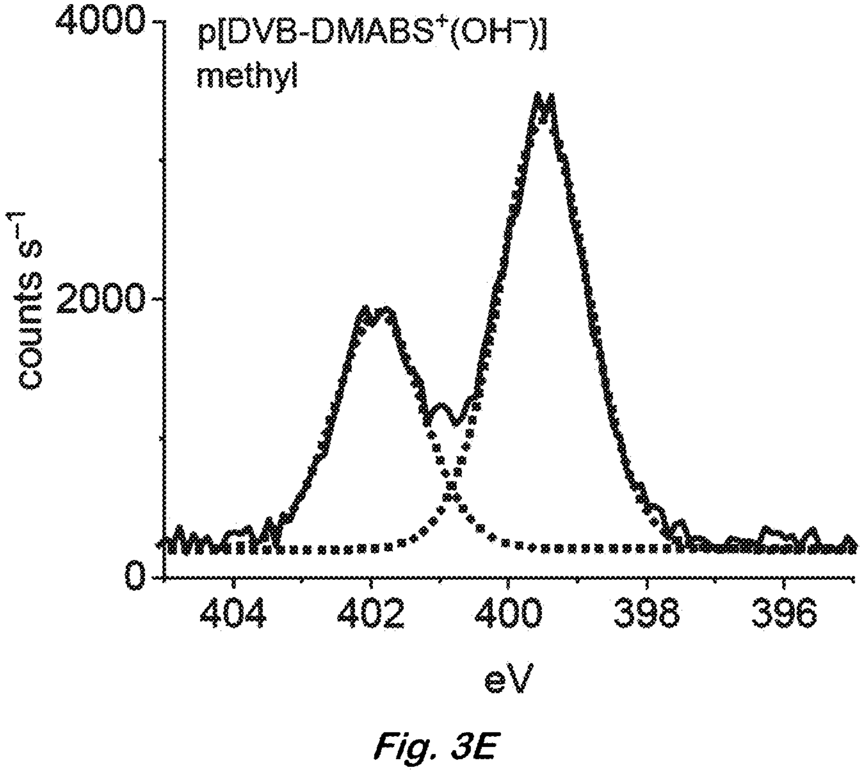
FIGS. 3E-G show nitrogen Nis XPS spectra of p[DVB-DMABS$^+$(OH$^-$)]methyl (FIG. 3E), octyl tail (FIG. 3F), and octyl linker (FIG. 3G).
Figure 3F:
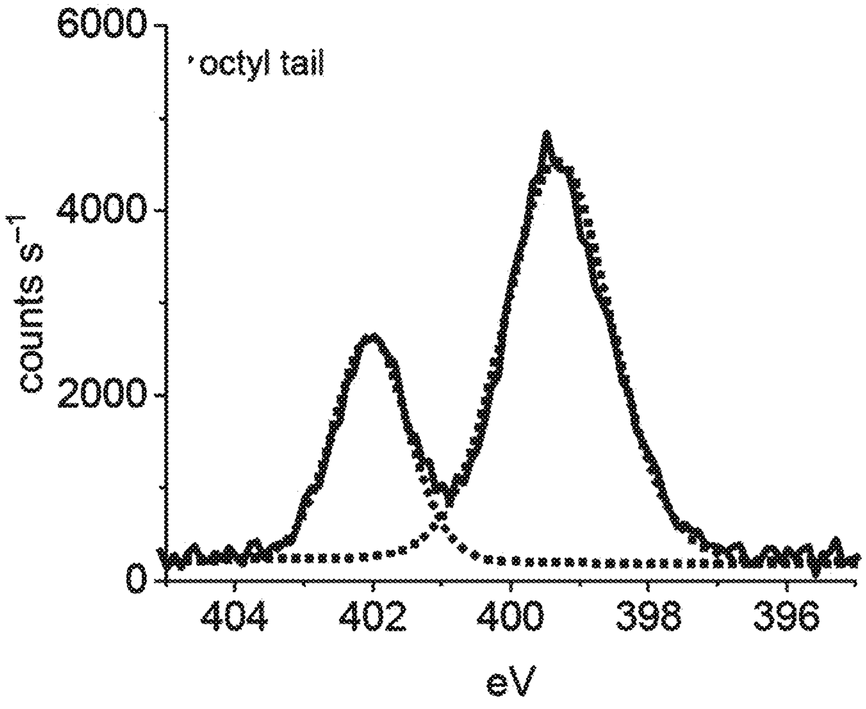
Figure 3G:
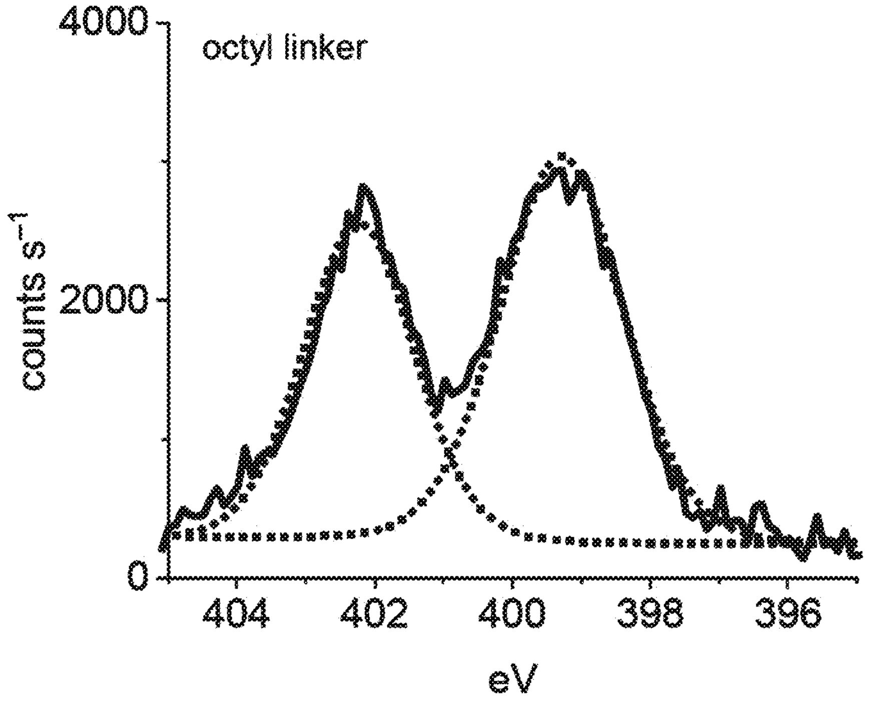

Attenuated total reflectance—Fourier transform infrared spectroscopy (ATR-FTIR)—A Thermo Scientific Nicolet iS50 FTIR with a one-bounce diamond ATR attachment was used to collect ATR-FTIR spectra of the polymer electrolytes supported within Celgard 2500 membranes, using 32 scans and a resolution of 2 $cm^1$. Results are shown in FIG. 3A X-ray photoelectron spectroscopy (XPS)—Polymer electrolytes supported within Celgard 2500 membranes were analyzed using a NEXSA XPS (Thermo Fisher Scientific). Collection parameters include a pass energy of 30 eV, a dwell time of 50 ms, a 400 μm beam spot, and 20 scans. A flood gun was activated during data acquisition to prevent charging of samples. Results are shown in FIGS. 3B-G.

Zincate diffusion experiment and measurement—A saturated zincate solution was prepared by stirring excess ZnO powder in 6 M KOH in water. An H-type diffusion cell was assembled with one compartment containing 6 M KOH, the other compartment containing zincate-saturated 6 M KOH, and a Celgard-supported p[DVB-DMABS$^+$($OH^-$)] octyl linker separating the two solutions. An aliquot of the originally zincate-free solution was collected after 24 h. Zinc content was measured using inductively coupled plasma optical emission spectroscopy (ICP-OES; Agilent model 5900), where samples were prepared by diluting 50 μL of the previously collected aliquot in 10 mL of 5% nitric acid. Six standards and a blank were prepared in 5% nitric acid, ranging in Zn concentration from 0.01-10 mg/L. At each wavelength used to monitor Zn (202.548 nm, 206.200 nm, and 213.857 nm) the calibration curve returned an $R^2$ value >0.9999. Additional operating parameters are shown below (Table 2).

TABLE 2

ICP-OES parameters for measuring Zn concentration

| Gas | UHP argon |
|---|---|
| Replicate count | 3 |
| Pump speed (rpm) | 12 |
| Rinse time (s) | 30 |
| Read time (s) | 5 |
| RF power (KW) | 1.2 |
| Viewing mode | Radial |
| Viewing height (mm) | 8 |
| Nebulizer flow (L/min) | 0.7 |
| Plasma flow (L/min) | 12 |
| Aux flow (L/min) | 1 |

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

REFERENCES

[1] You, W.; Noonan, K. J.; Coates, G. W. Alkaline-stable anion exchange membranes: A review of synthetic approaches. *Progress in Polymer Science* 2020, 100, 101177.

[2] Ford, H. O.; Chaloux, B. L.; Jayakody, N. J.; Klug, C. A.; Ruzicka, E. G.; Tighe, M. E.; DeBlock, R. H.; Long, J. W.; Rolison, D. R.; Sassin, M. B. Single-ion conducting polymer electrolytes for rechargeable alkaline Ag—Zn batteries. *ACS Organic Inorganic Au,* 2025, 5, 37-46.

[3] Ezzeldin, H. A.; Apblett, A.; Foutch, G. L. Synthesis and properties of anion exchangers derived from chloromethyl styrene codivinylbenzene and their use in water treatment. *International Journal of Polymer Science* 2010, 684051.

[4] U.S. Pat. No. 10,290,890-B2: Yan, Y.; Xu, B.; Wang, J.; Zhao, Y. Poly(aryl piperidinium) polymers for use as hydroxide exchange membranes and ionomers, assigned Feb. 16, 2022.

[5] US Patent Application 20200308341-A1: Yan, Y.; Hu, K.; Wang, J.; Wang, L.; Rojas-Carbonell, S.; Setzler, B. Polymers having stable cationic pendant groups for use as anion exchange membranes, published Nov. 28, 2023.

[6] U.S. Pat. No. 9,370,773-B2: Masel, R. L.; Chen, Q.; Liu, Z.; Kutz, R. Ion-conducting membranes (Jun. 21, 2016).

[7] U.S. Pat. No. 9,309,343-B2: Van Berchum, B.; Van Baak, W.; Hessing, J. Curable compositions and membranes, (Apr. 4, 2016).

[8] US Patent Application 20220212183-A1: Kerres, J. Cross-linked high stable anion exchange blend membranes with polyethyleneglycols as hydrophilic membrane phase, published Jul. 7, 2022.

[9] US Patent Application 20170014772-A1: Linder, C.; Kedem, O.; Messalem, R. Anion exchange membrane, its preparation method and use, abandoned Feb. 2, 2018.

[10] U.S. Pat. No. 10,125,036-B2: Jikihara, A.; Kobayashi, K.; Nakashima, T.; Higa, M. Ion exchange membrane, method for producing same, and electrodialyzer, assigned Mar. 24, 2022.

[11] U.S. Pat. No. 10,626,029-B2: Lin, J. R. High-performance anion exchange membranes and methods of making same (May 26, 2023).

[12] Ford, H. O.; Chaloux, B. L.; Jugdersuren, B.; Liu, X.; Klug, C. A.; Miller, J. B.; Zuo, X.; Swift, M. W.; Johannes, M. D.; Long, J. W.; Rolison, D. R.; Sassin, M. B. Non-line-of-sight synthesis and characterization of a conformal submicron-thick cationic polymer deposited on 2D and 3D substrates. *RSC Applied Interfaces* 2024, 1, 531-543.

[13] Ford, H. O.; Chaloux, B. L.; Kim, Y.; Long, J. W.; Rolison, D. R.; Sassin, M. B. Submicron-thick single anion-conducting polymer electrolytes. *RSC Applied Interfaces* 2024, 1, 522-530.

[14] Martin, T. P.; Gleason, K. K. Combinatorial initiated CVD for polymeric thin films. *Chemical Vapor Deposition* 2006, 12, 685-691.

[15] Marino, M. G.; Kreuer, K. D. Alkaline stability of quaternary ammonium cations for alkaline fuel cell membranes and ionic liquids. *ChemSusChem* 2015, 8, 513-523.

[16] Ryo, A.; Yokota, N.; Miyatake, K. Chemically stable, highly anion conductive polymers composed of quinquephenylene and pendant ammonium groups. *Macromolecules* 2019, 52, 2131-2138.

[17] Mahmoud, A. M. A.; Miyatake, K. Optimization of the pendant chain length in partially fluorinated aromatic anion exchange membranes for alkaline fuel cells. *Journal of Materials Chemistry A* 2018, 6, 14400-14409.
[18] Pham, T. H.; Olsson, J. S.; Jannasch, P. Poly(arylene alkylene)s with pendant N-spirocyclic quaternary ammonium cations for anion exchange membranes. *Journal of Materials Chemistry A* 2018, 6, 16537-16547.
[19] Mahmoud, A. M. A.; Miyatake, K. Tuning the hydrophobic component in reinforced poly(arylimidazolium)-based anion exchange membranes for alkaline fuel cells. *ACS Applied Energy Materials* 2022, 5, 15211-15221.
[20] Mandal, J. R.; Singh, K.; Shahi, V. K. Amphoteric membrane loaded with a noble metal-free hollow spherical NiCoP@rGO bifunctional electrocatalyst for alkaline water electrolyzers. *ACS Applied Energy Materials* 2022, 5, 8611-8620.
[21] Kimura, T.; Matsumoto, A.; Inukai, I.; Miyatake, K. Highly anion conductive polymers: how do hexafluoroisopropylidene groups affect membrane properties and alkaline fuel cell performance?*ACS Applied Energy* Materials 2019, 3, 469-477.
[22] Kimura, T.; Matsumoto, A.; Miyatake, K. Properties and morphologies of anion-exchange membranes with different lengths of fluorinated hydrophobic chains. *ACS Omega* 2022, 7, 13577-13587.
[23] Schönemann, E.; Laschewsky, A.; Rosenhahn, A. Exploring the long-term hydrolytic behavior of zwitterionic polymethacrylates and polymethacrylamides. *Polymers* 2018, 10, 639.
[24] Carbone, A.; Zignani, S. C.; Gatto, I.; Pedicini, R.; Oldani, C.; Cattaneao, A.; Arico, A. S. Aquivion-based anion exchange membranes: Synthesis optimization via dispersant agents and reaction time. *Chemical Engineering Journal* 2023, 455, 140765.
[25] Liu, X.; Wei, W.; Yang, Y.; Li, Y.; Li, Y.; Xu, S.; Dong, Y.; He, R. A porous membrane electrolyte enabled by poly (biphenyl piperidinium triphenylmethane) for dendrite-free zinc anode with enhanced cycling life. *Chemical Engineering Journal* 2022, 437, 135409.
[26] Yan, X.; Zhang, H.; Hu, Z.; Li, L.; Hu, L.; Li, Z.; Gao, L.; Dai, Y.; Jian X.; He, G. Amphoteric-side-chain-functionalized “ether-free” poly (arylene piperidinium) membrane for advanced redox flow battery. *ACS Applied Materials & Interfaces* 2019, 11, 44315-44324.
[27] Shirole, A.; Bakvand, P. M.; Jannasch, P. Hydroxide ion conducting membranes dually functionalized with cationic and zwitterionic groups. *ACS Applied Energy Materials* 2023, 6, 7240-7249.
[28] U.S. Pat. No. 9,321,047-B2: Jikihara, A.; Kobayashi, K.; Fujiwara, N. Anion exchange membrane and method for producing same, expired Jun. 3, 2024.
[29] U.S. Pat. No. 11,512,156-B2: Yan, Y.; Hu, K.; Wang, J.; Wang, L.; Xu, B.; Zhao, Y. Poly(arylpiperidinium) polymers including those having stable cationic pendant groups for use as anion exchange membranes and ionomers (Nov. 29, 2022).
[30] U.S. Pat. No. 10,947,339-B2: Miyatake, K.; Miyake, J.; Ono, H.; Shimada, M.; Yokota, N.; Yoshimura, N.; Asazawa, K.; Nishino, E. Anion exchange resin, method for producing thereof, electrolyte membrane for fuel cell, binder for forming electrode catalyst layer, fuel cell electrode catalyst layer and fuel cell, assigned Sep. 14, 2021.
[31] U.S. Pat. No. 10,727,515-B2: Miyatake, K.; Miyake, J.; Ono, H.; Shimada, M.; Yokota, N.; Yoshimura, N.; Takano, A.; Asazawa, K.; Nishino, E.; Kuwabara, Y. Anion exchange resin, electrolyte membrane, binder for forming electrode catalyst layer, fuel cell electrode catalyst layer and fuel cell (Sep. 14, 2021).
[32] US Patent Application 20130284601-A1: Van Der Wal, A.; Dlugolecki, P. E.; Reinhoudt, H. R.; Van Houtem, M. H. C. J.; Janssen, H. M. Method for preparing an anion exchange membrane with ion exchange groups and an apparatus for removal of ions, abandoned Nov. 2, 2015.
[33] Gaines, L. Secondary Silver-Zinc Battery Technology. *Journal of the Electrochemical Society* 1969, 116, 61C-67C.
[34] Mathew, V.; Schorr, N. B.; Sambandam, B.; Lambert, T. N.; Kim, J. A critical comparison of mildly acidic versus alkaline zinc batteries. *Accounts of Materials Research* 2023, 4, 299-306.
[35] Baca, R.; Juirez, G.; Solache, H.; Andraca, J.; Martinez, J.; Garcia, O.; Kryshtab, T.; Pena-Sierra, R. Kinetics of the oxidation of Zn foils in air atmosphere. *IOP Conf Ser-Mat Sci* 2010, 8, 012043.

What is claimed is:

1. A copolymer of a divinylbenzene and a compound having the formula:

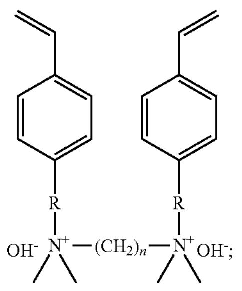

wherein each R is an independently selected n-alkylene group; and wherein n is a positive integer.

2. The copolymer of claim 1, wherein each R is methylene.

3. The copolymer of claim 1, wherein each R is n-butylene.

4. The copolymer of claim 1, wherein n is 8.

5. A battery comprising:

an anode;

a cathode; and a separator between the anode and the cathode;

wherein the separator comprises the copolymer of claim 1.

6. The battery of claim 5;

wherein the anode comprises zinc; and wherein the cathode comprises silver.

7. The battery of claim 5, wherein the separator comprises a porous membrane permeated with the copolymer.

8. The battery of claim 5, wherein the separator comprises:

an inner layer comprising a first porous membrane permeated with the copolymer;

wherein R is n-butylene and n is 8; and two outer layers surrounding the inner layer, each of the outer layers comprising a second porous membrane permeated with a second copolymer of a second divinylbenzene and a monomer having the formula:

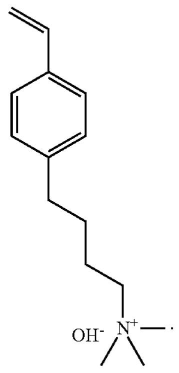
* * * * *